United States Patent
Mori et al.

(10) Patent No.: US 12,215,920 B2
(45) Date of Patent: Feb. 4, 2025

(54) HEATING DEVICE AND REFRIGERATOR EQUIPPED WITH HEATING DEVICE

(71) Applicant: Panasonic Intellectual Property Management Co., Ltd., Osaka (JP)

(72) Inventors: Kiyoshi Mori, Shiga (JP); Kei Nambu, Kyoto (JP); Tsuyoki Hirai, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 884 days.

(21) Appl. No.: 17/287,088

(22) PCT Filed: Aug. 6, 2019

(86) PCT No.: PCT/JP2019/030903
§ 371 (c)(1),
(2) Date: Apr. 20, 2021

(87) PCT Pub. No.: WO2020/084862
PCT Pub. Date: Apr. 30, 2020

(65) Prior Publication Data
US 2021/0381755 A1 Dec. 9, 2021

(30) Foreign Application Priority Data
Oct. 23, 2018 (JP) .................. 2018-199428

(51) Int. Cl.
*F25D 31/00* (2006.01)
*F25D 17/06* (2006.01)
*F25D 23/12* (2006.01)

(52) U.S. Cl.
CPC ......... *F25D 31/005* (2013.01); *F25D 17/065* (2013.01); *F25D 23/12* (2013.01); *F25D 2317/061* (2013.01)

(58) Field of Classification Search
CPC ...... F25D 31/005; F25D 17/065; F25D 23/12; F25D 2317/061
See application file for complete search history.

(56) References Cited

U.S. PATENT DOCUMENTS 4,992,638 A 2/1991 Hewitt et al.

FOREIGN PATENT DOCUMENTS

| EP | 3 783 283 | 2/2021 |
| JP | S53-153558 A | 12/1978 |

(Continued)

OTHER PUBLICATIONS

International Search Report of PCTJP2019030903, Oct. 1, 2019, 5 pages including English translation.

(Continued)

*Primary Examiner* — Phuong T Nguyen
*Assistant Examiner* — Dilnessa B Belay
(74) *Attorney, Agent, or Firm* — HSML, P.C.

(57) ABSTRACT

The present invention provides a highly reliable and safe heating device that can uniformly heat an object to be heated and provides a refrigerator having a storage space in which frozen products as storage products can be easily thawed to a high-quality state. A heating device of the present invention includes an oscillation electrode disposed on one hand of the heating space and having an electrode surface on which an electric field concentration region is formed, a counter electrode disposed on the other hand of the heating space and having an electrode surface that faces the electrode surface of the oscillation electrode, and a high-frequency electric field forming unit for forming a high-frequency electric field applied to between the oscillation electrode and the counter electrode.

13 Claims, 10 Drawing Sheets

(56) References Cited

FOREIGN PATENT DOCUMENTS

| | | |
|---|---|---|
| JP | S55-79970 | 6/1980 |
| JP | S56-111794 U | 8/1981 |
| JP | H02-64323 | 3/1990 |
| JP | H08-185966 | 7/1996 |
| JP | H08-327201 | 12/1996 |
| JP | 2002-136430 | 5/2002 |
| JP | 2002-147919 | 5/2002 |
| JP | 2005129335 A * | 5/2005 |
| JP | 2014159896 A * | 9/2014 |
| JP | 2017-182885 | 10/2017 |

OTHER PUBLICATIONS

International Preliminary Report on Patentability of PCT/JP2019/030903, May 6, 2021, 23 pages including English translation.

Office Action issued for Chinese Patent Application No. 201980069851.2, May 25, 2022, 12 pages including partial translation.

Office Action issued for Japanese Patent Application No. 2018-199428, mailed on Mar. 7, 2023, 6 pages including machine translation.

The extended European search report issued for European Patent Application No. 19875319.6, Nov. 10, 2021, 10 pages.

Office Action issued for Japanese patent application No. 2018-199428, Aug. 22, 2023, 4 pages including machine translation.

Office Action issued for Japanese patent application No. 2018-199428, Aug. 16, 2022, 8 pages including machine translation.

Notice of Reasons for Refusal issued in Japanese Patent Application No. 2018-199428, May 7, 2024, with machine tranlsation (31 pages).

Notice of Reasons for Refusal issued in Japanese Patent Application No. 2018-199428, Aug. 6, 2024, with machine translation (5 pages).

* cited by examiner (a)

(b)

(a)

(b)

(a)

(b)

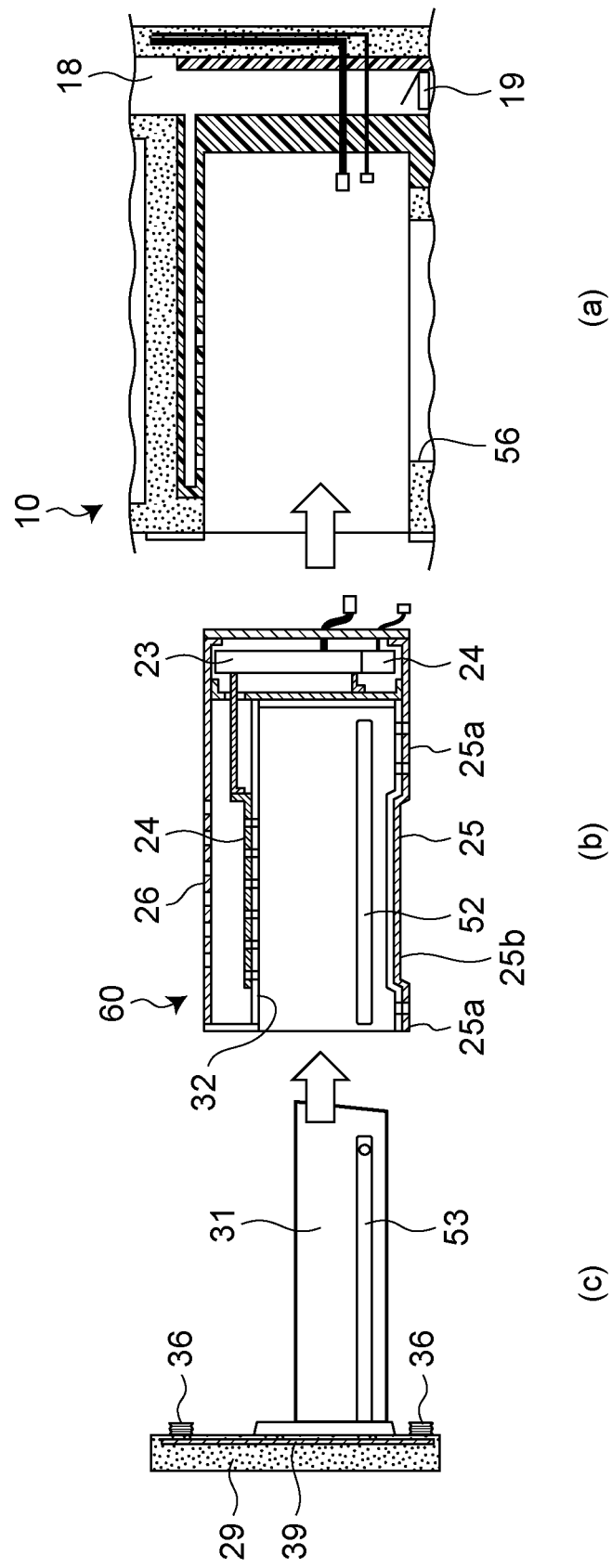

HEATING DEVICE AND REFRIGERATOR EQUIPPED WITH HEATING DEVICE

TECHNICAL FIELD

The present invention relates to a heating device having a heating chamber capable of thawing a frozen product, and to a refrigerator equipped with the heating device.

BACKGROUND ART

A general refrigerator is provided with a freezing chamber and is used to freeze foodstuffs, foods, etc. as frozen products for long-term storage. It is desirable that such frozen products be thawed in a short time and used for cooking in a thawed state as close to fresh as possible.

In order to thaw the frozen products, there are thawing processes such as natural thawing at room temperature and running-water thawing with tap water, but these thawing processes did not satisfy the thawing in a short time required by the cook. In ordinary homes, a microwave cooking device, a so-called microwave oven is used to thaw the frozen products in a short time. However, although when thawing frozen foods by the microwave oven, they can be thawed in a short time, in some cases there occurred an undesired thawed state such as so-called "partial boiling" that high-frequency energy is concentrated on the previously thawed part to impede uniform thawing. In this way, when the frozen foods are thawed using the microwave oven, it was not easy to obtain the desired high-quality thawed state. Here, the high-quality thawed state means a thawed state that is not delicious as a food such as occurrence of "partial boiling".

Patent Document 1 discloses a refrigerator including a high-frequency heating chamber configured to thaw a frozen product while supplying cold air and irradiating microwaves. In the refrigerator of the Patent Document 1, the configuration is such that the interior of the frozen product is thawed by irradiating microwaves onto the frozen product while covering the surface of the frozen product in the high-frequency heating chamber with cold air.

PATENT DOCUMENT

Patent Document 1: JP 2002-147919 A

SUMMARY OF THE INVENTION

Problem to be Solved by the Invention

In the refrigerator disclosed in Patent Document 1, a magnetron is disposed to form microwaves so that frozen products within the high-frequency heating chamber are irradiated with microwaves for microwave heating. Due to the disposition of the magnetron as microwave forming means and its cooling mechanism, the refrigerator of Patent Document 1 had a large structure as a whole of the refrigerator and made it difficult to reduce the size. Due to the configuration where frozen products within the high-frequency heating chamber is irradiated, from an antenna, with microwaves for microwave heating, it was difficult to uniformly heat the frozen products to thaw them to a desired state.

Although there generally exist a high-frequency heating device for thawing frozen products using high frequency waves in VHF band and a technique where a pair of electrodes are disposed therein to form an electric field between the electrodes to thereby thaw frozen products, such a conventional high-frequency heating device had a problem that the electric field generated between the pair of electrodes is not uniform, rendering it difficult to uniformly thaw the frozen products.

Furthermore, in the configuration disposing the high-frequency heating device in the refrigerator to perform the thawing process, to prevent high-frequency waves from the high-frequency heating device from adversely affecting preserved foods in other storage chambers and the user who handles them, it is necessary to reliably secure both the function as a heating device and the function as a refrigerator (cooling function, storage function) and to have a highly safe configuration.

An object of the present invention is to provide a highly reliable and safe heating device that can uniformly heat an object to be heated and to provide a refrigerator having a storage space in which frozen products as storage products can be easily thawed to a high-quality state, by incorporating the heating device therein.

Means for Solving Problems

A heating device according to an aspect of the present invention is a heating device includes: a heating chamber having a heating space that contains an object to be heated; an oscillation electrode disposed on one hand of the heating space and having an electrode surface on which an electric field concentration region is formed; a counter electrode disposed on the other hand of the heating space and having an electrode surface that faces the electrode surface of the oscillation electrode; and a high-frequency electric field forming unit for forming a high-frequency electric field applied to between the oscillation electrode and the counter electrode, A refrigerator according to an aspect of the present invention is a refrigerator at least includes the heating device including: a heating chamber having a heating space that contains an object to be heated; an oscillation electrode disposed on one hand of the heating space and having an electrode surface on which an electric field concentration region is formed; a counter electrode disposed on the other hand of the heating space and having an electrode surface that faces the electrode surface of the oscillation electrode; and a high-frequency electric field forming unit for forming a high-frequency electric field applied to between the oscillation electrode and the counter electrode.

Effect of the Invention

According to the present invention, it becomes possible to provide a heating device capable of equalizing the electric field between the electrodes in dielectric heating and to build a highly safe refrigerator that has a storage chamber capable of easily thawing the frozen products to a high-quality state using this heating device and that secures reliable cooling and storage functions.

BRIEF DESCRIPTION OF DRAWINGS

FIG. 11 is a longitudinal sectional view showing the state when the heating device of the second embodiment is incorporated in the refrigerator.

EMBODIMENT(S) FOR CARRYING OUT THE INVENTION

Figure 1:
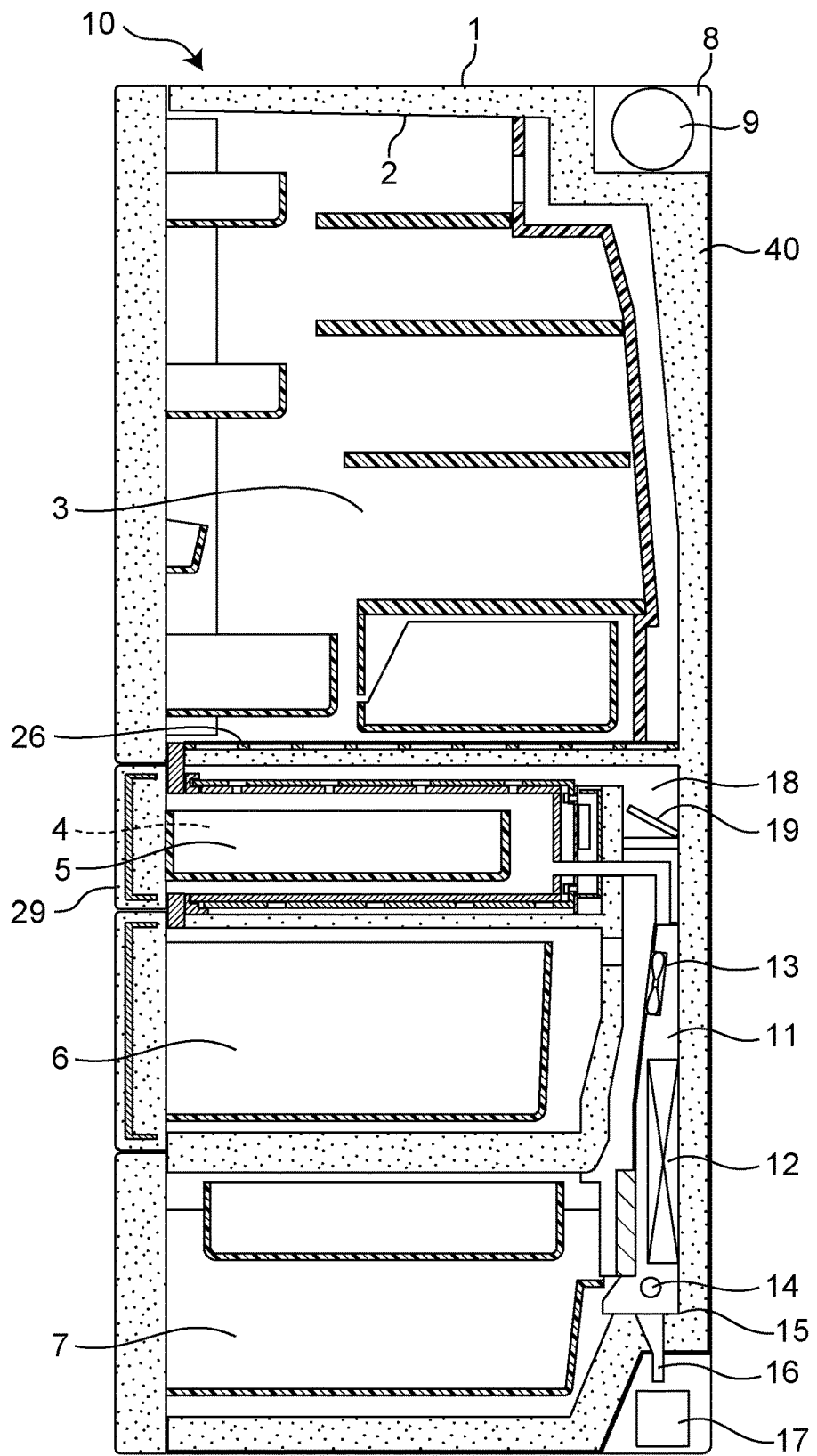
FIG. 1 is a sectional view showing a longitudinal section of a refrigerator of a first embodiment according to the present invention.

Hereinafter, referring to the accompanying drawings, a refrigerator with freezing function will be described as embodiments of a refrigerator having a heating device according to the present invention. Note that the refrigerator according to the present invention is not limited to configurations of the refrigerator described in the following embodiments and is applicable also to a freezer with only freezing function and that it includes various types of refrigerators and freezers having technical features that will be described in the following embodiments. Accordingly, in the present invention, the refrigerator has a configuration having a refrigerating chamber and/or a freezing chamber.

Numerical values, shapes, configurations, steps, and the order of steps shown in the following embodiments are examples and do not limit the present invention. Among constituent elements in the following embodiments, constituent elements not defined in independent claims that represent the uppermost concepts will be described as optional constituent elements. In each embodiment, the same elements may be designated by the same reference numerals and description thereof may be omitted. The drawings schematically show mainly constituent elements for easy understanding.

First of all, various aspects of the heating device of the present invention will be exemplified.

A heating device according to the first aspect of the present invention includes: a heating chamber having a heating space that contains an object to be heated; an oscillation electrode disposed on one hand of the heating space and having an electrode surface on which an electric field concentration region is formed; a counter electrode disposed on the other hand of the heating space and having an electrode surface that faces the electrode surface of the oscillation electrode; and a high-frequency electric field forming unit for forming a high-frequency electric field applied to between the oscillation electrode and the counter electrode. According to the first aspect, it becomes possible to provide a heating device capable of equalizing the electric field between the electrodes in dielectric heating.

The heating device according to the second aspect of the present invention, in the first aspect, wherein the electric field concentration region may be formed in a dispersed manner on the electrode surface of the oscillation electrode.

The heating device according to the third aspect of the present invention, in the first or second aspect, wherein the electric field concentration region of the oscillation electrode may be an edge part of an opening portion formed in the electrode surface.

The heating device according to the fourth aspect of the present invention, in the third aspect, wherein the opening portion formed in the electric field concentration region of the oscillation electrode may be an electrode hole or an electrode notch.

The heating device according to the fifth aspect of the present invention, in the any one of the first to fourth aspects, wherein an electric field concentration region may be formed on the electrode surface of the counter electrode, with the electric field concentration region of the counter electrode being arranged so as not to face the electric field concentration region of the oscillation electrode.

The heating device according to the sixth aspect of the present invention, in the fifth aspect, wherein the electric field concentration region may be formed in a dispersed manner on the electrode surface of the counter electrode.

The heating device according to the seventh aspect of the present invention, in the fifth or sixth aspect, wherein the electric field concentration region of the counter electrode may be an edge part of an opening portion formed in the electrode surface.

The heating device according to the eighth aspect of the present invention, in the seventh aspect, wherein the opening portion formed in the electric field concentration region of the counter electrode may be an electrode hole or an electrode notch.

The heating device according to the ninth aspect of the present invention, in any one of the first to eighth aspects, wherein the oscillation electrode and the counter electrode may be configured not to be exposed to the heating space.

The heating device according to the 10th aspect of the present invention, in any one of the first to eighth aspects, may include an inner surface member that defines an inner surface of the heating chamber, the inner surface member being configured so as to cover respective electrode surfaces that face each other, of the oscillation electrode and the counter electrode.

The heating device according to the 11th aspect of the present invention, in any one of the first to 10th aspects, may include an electromagnetic wave shield that restrains radiation of electromagnetic waves from the oscillation electrode and the counter electrode to the outside of the device.

The heating device according to the 12th aspect of the present invention, in any one of the first to 11th aspects, may include a door that allows the object to be heated to be put in and taken out from the heating space of the heating chamber, wherein the door has an electromagnetic wave shield disposed thereon.

A refrigerator according to the 13th aspect of the present invention, includes the heating device according to any one of the first to 12th aspects. Due to including the heating device capable of equalizing the electric field between the electrodes in dielectric heating, the thus configured refrigerator of the 13th aspect results in a highly safe refrigerator that has a storage chamber capable of easily thawing the frozen products to a high-quality state using this heating device and that secures reliable cooling and storage functions.

First Embodiment

Hereinafter, a first embodiment of a refrigerator having a heating device according to the present invention will be described with reference to the drawings. FIG. 1 is a view showing a longitudinal section of a refrigerator 10 of the first embodiment. In FIG. 1, the left side is the front surface side of the refrigerator 10, and the right side is the back surface side of the refrigerator 10. The refrigerator 10 is configured from a heat insulating box that is formed by an outer box 1 mainly made of steel plate, an inner box 2 molded of resin such ABS, and a heat insulation material (e.g. rigid urethane foam) 40 filled and foamed in a space between the outer box 1 and the inner box 2.

The heat insulating box of the refrigerator 10 has a plurality of storage chambers, with an openable/closable door arranged at a front opening of each storage chamber. Each storage chamber is sealed to prevent cold air from leaking due to closing of the door. In the refrigerator 10 of the first embodiment, an uppermost storage chamber is a refrigerating chamber 3. Two storage chambers, an ice-making chamber 4 and a freezing/thawing chamber 5, are juxtaposed on both sides directly below the refrigerating chamber 3. Furthermore, a freezing chamber 6 is disposed directly below the ice-making chamber 4 and the freezing/thawing chamber 5, with a vegetable chamber 7 disposed at a lowermost part directly below the freezing chamber 6. Although the storage chambers in the refrigerator 10 of the first embodiment have the above configuration, this configuration is an example and the arrangement configuration of the storage chambers can be appropriately changed at the time of design according to specifications, etc.

The refrigerating chamber 3 is maintained at a non-freezing temperature for refrigerated storage of stuff such as food to be preserved, as a specific temperature example, in a temperature range of 1° C. to 5° C. The vegetable chamber 7 is maintained in a temperature range equal to or slightly higher than the refrigerating chamber 3, for example, 2° C. to 7° C. The freezing chamber 6 is set to a freezing temperature range for frozen storage, as a specific temperature example, for example, −22° C. to −15° C. The freezing/thawing chamber 5 is normally maintained in the same freezing temperature range as the freezing chamber 6 and, in response to a user's thawing command, performs a thawing process for thawing the preserved stuff (frozen product) stored. The configuration of the freezing/thawing chamber 5 and details on the thawing process will be described later.

A machine chamber 8 is disposed at an upper part of the refrigerator 10. The machine chamber 8 houses e.g. parts making up a freezing cycle such as a compressor 9 and a dryer that removes water during the freezing cycle. Note that the arrangement position of the machine chamber 8 is not specifically limited to the upper part of the refrigerator 10 and is appropriately determined depending on e.g. the arrangement position of the freezing cycle and that it may be disposed at another region such as a lower part of the refrigerator 10.

A cooling chamber 11 is disposed on the back surface side of the freezing chamber 6 and the vegetable chamber 7 that lie in a lower region of the refrigerator 10. Disposed in the cooling chamber 11 are a cooler 12 that is a component of the freezing cycle producing cold air, and a cooling fan 13 sending cold air produced by the cooler 12 to each of the storage chambers (3, 4, 5, 6, and 7). By the cooling fan 13, cold air produced by the cooler 12 flows through an air passage 18 connecting to each storage chamber and is supplied to each storage chamber. A damper 19 is disposed in the air passage 18 connecting to each storage chamber, and each storage chamber is maintained in a predetermined temperature range by controlling the rotation speed of the compressor 9 and the cooling fan 13 and controlling the opening and closing of the damper 19. A defrost heater 14 for defrosting frost and ice adhering to the cooler 12 and its surroundings is disposed below the cooling chamber 11. A drain pan 15, a drain tube 16, and an evaporating dish 17 are disposed below the defrost heater 14 and have a configuration for evaporating water generated during defrosting, etc.

The refrigerator 10 of the first embodiment includes an operation unit 47 (see FIG. 3 described later). In the operation unit 47, the user can issue various commands (for example, temperature setting of each storage chamber, quenching command, thawing command, ice-making stop command, etc.) to the refrigerator 10. The operation unit 47 has a display unit for notifying the occurrence of an abnormality or the like. The refrigerator 10 may be configured to include a wireless communication unit so that it can be connected to a wireless LAN network to input various commands from the user's external terminal. The refrigerator 10 may be configured to include a voice recognition unit so that the user can input a voice command.

Figure 2:
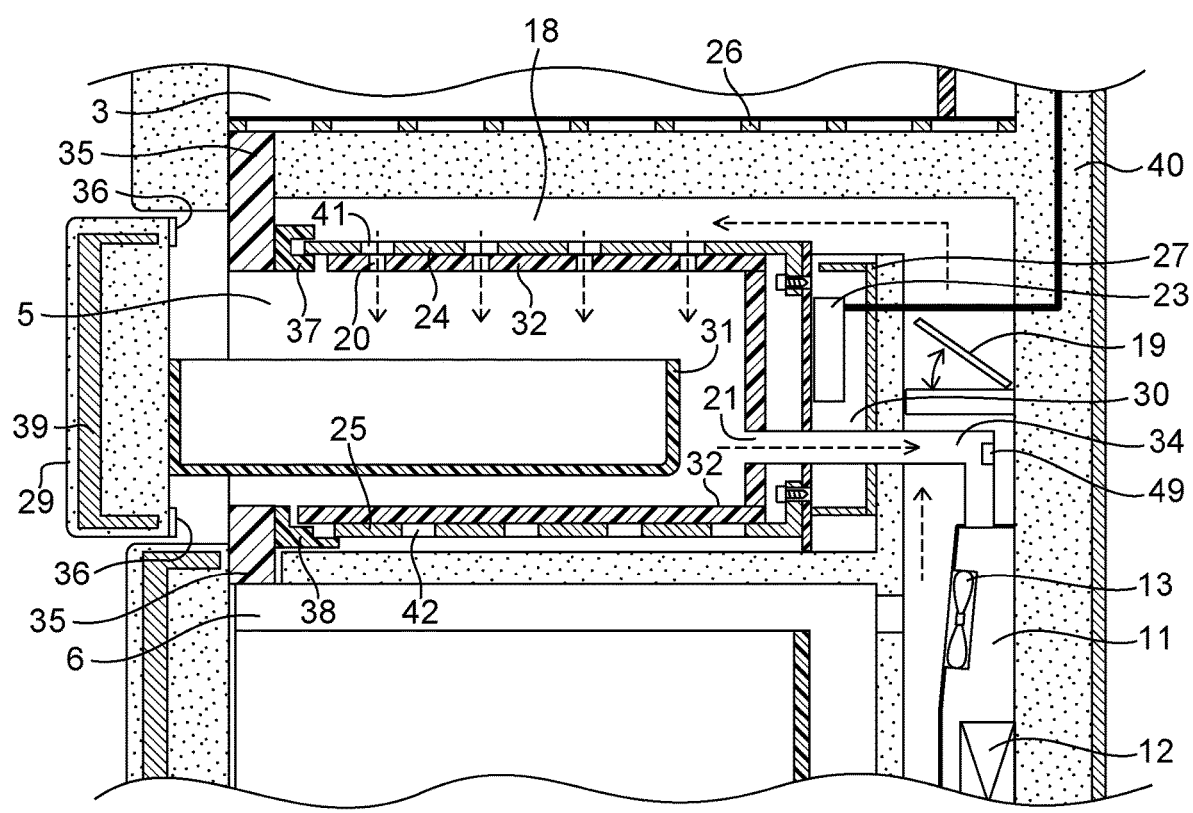
FIG. 2 is a longitudinal sectional view showing a freezing/thawing chamber in the refrigerator of the first embodiment.

FIG. 2 is a longitudinal sectional view showing the freezing/thawing chamber 5 in the refrigerator 10 of the first embodiment. The freezing/thawing chamber 5 is a freezing chamber that holds, in the freezing temperature range, preserved stuff such as food stored in the freezing/thawing chamber 5, and acts as a thawing chamber performing a thawing process by dielectric heating when a thawing command for the preserved stuff is input in the refrigerator 10. In this manner, the refrigerator 10 of the first embodiment has a configuration having a heating device with a dielectric heating function so that the thawing process by dielectric heating can be executed in the freezing/thawing chamber 5. That is, the freezing/thawing chamber 5 corresponds to a heating chamber of the heating device.

In the freezing/thawing chamber 5, to ensure that it can be maintained in the same freezing temperature range as the freezing chamber 6, cold air produced by the cooler 12 flows through the air passage 18 disposed on the back surface side and top surface side of the freezing/thawing chamber 5 and is introduced into the freezing/thawing chamber 5 from a plurality of cold air introduction holes 20 disposed on a top surface of the freezing/thawing chamber 5. The damper 19 is disposed in the air passage 18 leading from the cooling chamber 11 to the freezing/thawing chamber 5, and by controlling the opening and closing of the damper 19, the freezing/thawing chamber 5 is maintained in a predetermined freezing temperature range so that the contained preserved stuff is frozen for preservation.

A cold air exhaust hole 21 is formed on a back surface of the freezing/thawing chamber 5. Cold air introduced into the freezing/thawing chamber 5 to cool the inside of the freezing/thawing chamber 5 returns from the cold air exhaust hole 21 through a return air passage 34 to the cooling chamber 11 and is recooled by the cooler 12. That is, the refrigerator 10 of the first embodiment has a configuration where the cold air formed by the cooler 12 is circulated.

A top surface, a back surface, both side surfaces, and a bottom surface making up an inner surface of a storage space in the freezing/thawing chamber 5 are formed from an inner surface member 32 of a resin material molded of an electrically insulating material. A door 29 is disposed in a front opening of the freezing/thawing chamber 5 so that the storage space of the freezing/thawing chamber 5 is sealed by closing the door 29. In the freezing/thawing chamber 5 of the first embodiment, a storage case 31 having an open upper part is disposed on the back surface side of the door 29, with a configuration such that the storage case 31 moves forward and backward at the same time by opening/closing actions of the door 29 in the forward and backward directions. The forward opening action of the door 29 facilitates putting and taking out preserved stuff such as food into/from the storage case 31.

[Dielectric Heating Mechanism]

Description will next be given of a dielectric heating mechanism in the heating device that performs dielectric heating to effect a thawing process for stuff frozen preserved in the freezing/thawing chamber 5.

Figure 3:
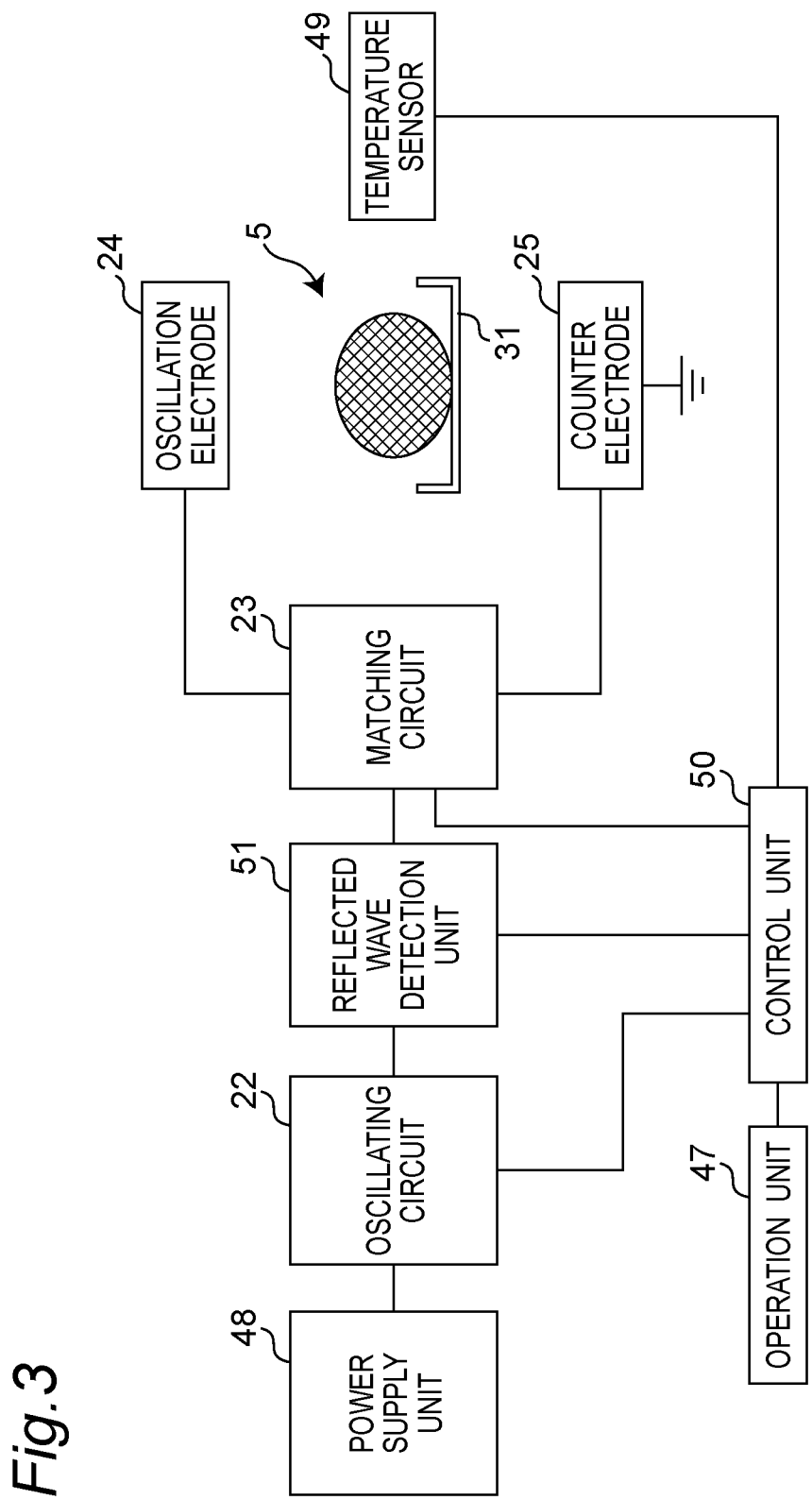
FIG. 3 is a block diagram showing a configuration of a dielectric heating mechanism disposed in the refrigerator of the first embodiment.

FIG. 3 is a block diagram showing a configuration of the dielectric heating mechanism disposed in the refrigerator 10 of the first embodiment. The dielectric heating mechanism in the first embodiment includes an oscillating circuit 22 in which electric power from a power supply unit 48 is input to form a predetermined high-frequency signal, a matching circuit 23, an oscillation electrode 24, a counter electrode 25, and a control unit 50. The oscillating circuit 22 configured by using semiconductor elements is reduced in size and is disposed in the machine chamber 8 of the refrigerator 10. The oscillating circuit 22 is electrically connected to the matching circuit 23 by a coaxial cable. The matching circuit 23 is arranged in an electrode holding region 30 (see FIG. 2) that is a space on the back surface side of the freezing/thawing chamber 5. The oscillating circuit 22 and the matching circuit 23 serve as a high-frequency electric field forming unit for forming a high-frequency electric field applied to between electrodes of the oscillation electrode 24 and the counter electrode 25.

The oscillation electrode 24 is a flat electrode arranged on the top surface side of the freezing/thawing chamber 5. The counter electrode 25 is a flat electrode arranged on the bottom surface side of the freezing/thawing chamber 5. The oscillation electrode 24 and the counter electrode 25 are arranged so as to face each other via a storage space (thawing space) of the freezing/thawing chamber 5, with an interval defining unit (33), etc. described in an "electrode holding mechanism" described later being disposed so that the facing interval is set to a preset predetermined interval (first interval). As a result, in the dielectric heating mechanism of the first embodiment, the oscillation electrode 24 and the counter electrode 25 are arranged substantially parallel. In the present invention, "substantially parallel" indicates an essentially parallel state but indicates including errors attributable to variations in processing accuracy, etc.

The oscillation electrode 24 is disposed on one side of the storage space, while the counter electrode 25 is disposed on the other side of the storage space with the storage space in between. An inner surface member 32 covers the matching circuit 23 on the back surface side, the oscillation electrode 24 on the top surface side, and the counter electrode 25 on the bottom surface side making up the dielectric heating mechanism, so as to have a configuration that can reliably prevent burning due to contact with preserved stuff.

Although the configuration of the first embodiment is described as the configuration where the oscillation electrode 24 is disposed on the top surface part making up the storage space of the freezing/thawing chamber 5, with the counter electrode 25 disposed on the bottom surface part of the storage space of the freezing/thawing chamber 5, the present invention is not limited to this configuration. Any configuration is acceptable as long as the oscillation electrode 24 and the counter electrode 25 face each other via the storage space (thawing space), and the same effect is achieved also by arranging them upside down or by arranging them to face each other in the left-right direction.

As shown in FIG. 2, the freezing/thawing chamber 5 has the configuration where cold air from the cooler 12 is introduced from the top surface side of the freezing/thawing chamber 5 through the air passage 18. The configuration is such that the oscillation electrode 24 is arranged on the undersurface of the air passage 18 on the top surface side of the freezing/thawing chamber 5 so that cold air from the cooling chamber 11 flows over the oscillation electrode 24. The refrigerator 10 of the first embodiment has the heat insulating box that is formed by the outer box 1, the inner box 2, and the heat insulation material 40 filled and foamed therebetween, but the space of this heat insulating box forming the storage chamber therein does not have high dimensional accuracy. In the space where the freezing/thawing chamber 5 is formed, a region serving as the air passage 18 is formed on the top surface side, and hence the region serving as the air passage 18 is a space capable of accommodating dimensional variations in the heat insulating box. The configuration will be described later in which cold air having passed through the air passage 18 passes through a plurality of electrode holes 41 formed in the oscillation electrode 24 and then is introduced from the cold air introduction holes 20 of the inner surface member 32 on the top surface side into the freezing/thawing chamber 5.

The oscillating circuit 22 outputs a voltage at a high frequency (40.68 MHz in the first embodiment) in the VHF band. When the oscillating circuit 22 outputs a high frequency voltage, an electric field is formed between the oscillation electrode 24 and the counter electrode 25, to which the oscillating circuit 22 is connected, to thereby dielectrically heat the preserved stuff as a dielectric placed in the storage space between the oscillation electrode 24 and the counter electrode 25 of the freezing/thawing chamber 5.

The matching circuit 23 makes an adjustment so that a load impedance formed by the oscillation electrode 24, the counter electrode 25, and the preserved stuff contained in the freezing/thawing chamber 5 matches an output impedance of the oscillating circuit 22. The matching circuit 23 minimizes the reflected wave with respect to the output electromagnetic wave by matching the impedances. The dielectric heating mechanism of the first embodiment includes a reflected wave detection unit 51 that detects a reflected wave returning from the oscillation electrode 24 toward the oscillating circuit 22. Accordingly, the oscillating circuit 22 is electrically connected to the oscillation electrode 24 via the reflected wave detection unit 51 and the matching circuit 23. The control unit 50 calculates the ratio (reflectance) of reflected wave output to electromagnetic wave output, based on the electromagnetic wave that is impedance-matched in the matching circuit 23 and output from the oscillating circuit 22 and on the reflected wave detected by the reflected wave detection unit 51, and performs various controls, based on the result of the calculation.

In the dielectric heating mechanism, as shown in the block diagram of FIG. 3, the control unit 50 drivingly controls the oscillating circuit 22 and the matching circuit 23, based on signals from the operation unit 47 with which the user performs setting operations, a temperature sensor 49 detecting the temperature inside the refrigerator, etc. The control unit 50 includes a CPU and executes control programs stored in a memory such as a ROM to perform various controls.

Since it is desirable that the length of the positive-side wiring connecting the oscillating circuit 22, the matching circuit 23, and the oscillation electrode 24 be short, the high-frequency electric field forming unit of the oscillating circuit 22 and the matching circuit 23 may be arranged in the electrode holding region 30 on the back surface side of the freezing/thawing chamber 5.

[Electrode Holding Mechanism]

Since the dielectric heating mechanism in the first embodiment configured as above has a configuration where the flat plate-shaped oscillation electrode 24 and the counter electrode 25 face each other substantially in parallel, the electric field is made uniform in the thawing space that is the storage space of the freezing/thawing chamber 5. In order to arrange the oscillation electrode 24 and the counter electrode 25 substantially in parallel with the predetermined interval (first interval) in this manner, the dielectric heating mechanism in the first embodiment has the electrode holding mechanism that will be described below.

Figure 4:
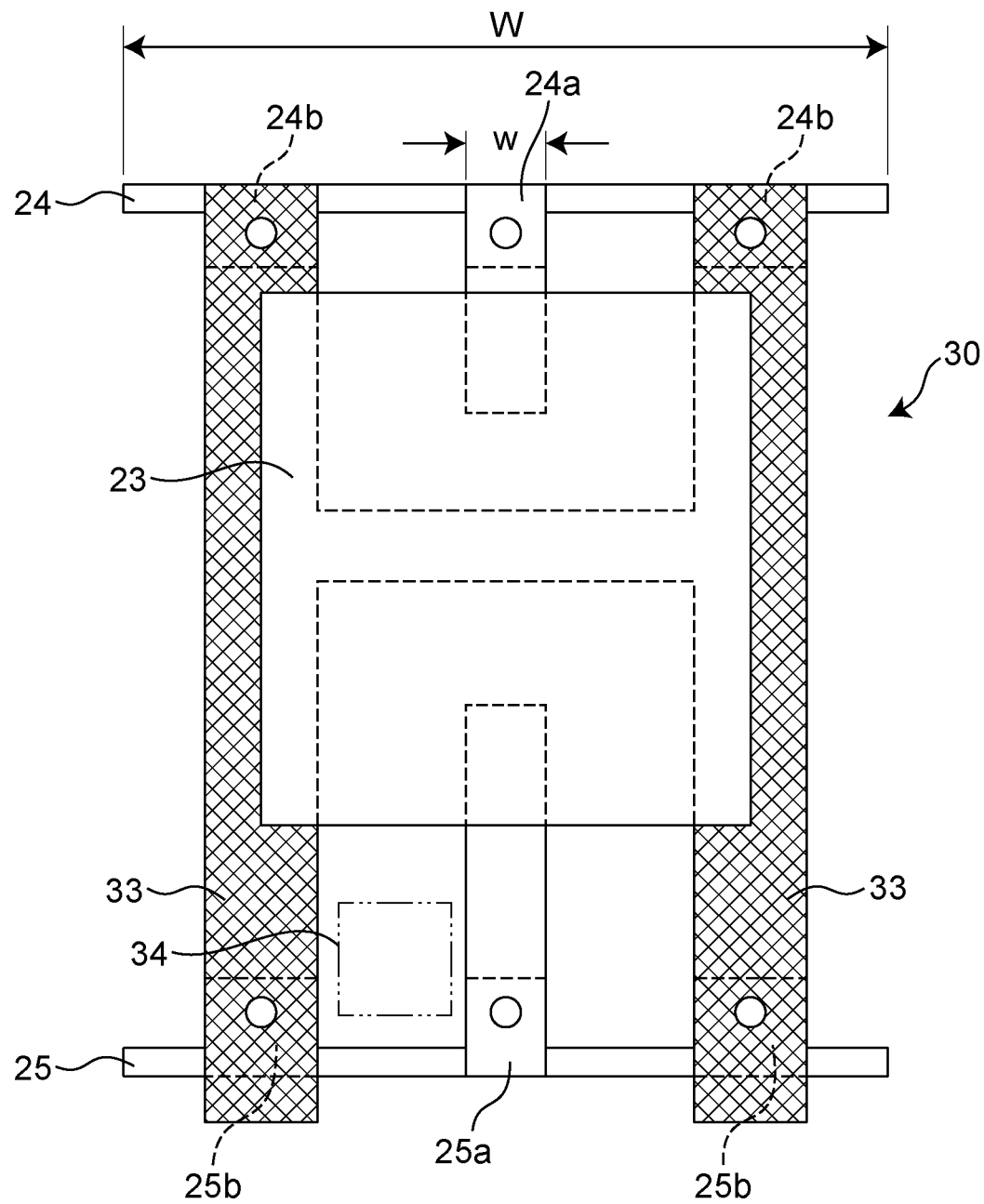
FIG. 4 is a view showing an electrode holding region on the back surface side of the freezing/thawing chamber in the refrigerator of the first embodiment.

FIG. 4 is a view showing the electrode holding region 30 on the back surface side of the freezing/thawing chamber 5 in the first embodiment and depicts the electrode holding mechanism in the electrode holding region 30. FIG. 4 is a view of the electrode holding region 30 as viewed from the back surface side, with the oscillation electrode being arranged on the upper side (top surface side), the counter electrode 25 being arranged on the lower side (bottom surface side). A positive electrode terminal 24a protrudes at the center of the back-surface-side end of the flat plate-shaped oscillation electrode 24, with support members 24b and 24b protruding on both sides thereof. The positive electrode terminal 24a and the support members 24b protrude bending at right angles downward (toward bottom surface side) from the back-surface-side end of the flat plate-shaped oscillation electrode 24. Similarly, a negative electrode terminal 25a protrudes at the center of the back-surface-side end of the flat plate-shaped counter electrode 25, with support members 25b and 25b protruding on both sides thereof. The negative electrode terminal 25a and the support members 25b protrude bending at right angles upward (toward the top surface side) from the back-surface-side end of the flat plate-shaped counter electrode 25. That is, protruding ends of the positive electrode terminal 24a and the support members 24b of the oscillation electrode 24 confront protruding ends of the negative electrode terminal 25a and the support members 25b of the counter electrode 25, respectively.

As described above, respective protruding directions of the support members 24b and 24b of the oscillation electrode 24 confront respective protruding directions of the support members 25b and 25b of the counter electrode 25, so that the support members 24b and 24b are rectilinearly joined via the interval defining unit 33 to the support members 25b and 25b, respectively. The interval defining unit 33 is a planar member and is formed from an electrically insulating member that is not substantially dielectrically heated. As shown in FIG. 4, the interval defining unit 33 has an H shape when viewed from the back surface side, with the support members (24b, 25b) being connected to upper and lower four ends of the H shape, the matching circuit 23 being fixed to the central portion of the H shape. Therefore, the oscillation electrode 24 and the counter electrode 25 are fixed to the upper and lower both ends of the interval defining unit 33 while the matching circuit 23 is fixed to the central portion of the interval defining unit 33, so that the oscillation electrode 24, the counter electrode 25, and the matching circuit 23 are securely held by the interval defining unit 33. In this manner, the interval defining unit 33 is configured to securely hold, with the determined distance (first interval), the oscillation electrode 24 and the counter electrode 25 that are substantially flat-plate shaped members. The interval defining unit 33 has a high rigidity because the matching circuit 23 is fixed to the central portion of the H shape thereof, and therefore can hold the oscillation electrode 24 and the counter electrode 25 with the predetermined facing interval (first interval) in a cantilevered manner. The interval defining unit 33 may be configured to include the high-frequency electric field forming unit of the oscillating circuit 22 and the matching circuit 23.

The positive electrode terminal 24a of the oscillation electrode 24 and the negative electrode terminal 25a of the counter electrode 25 is connected to positive and negative connection terminals of the matching circuit 23. The connection of the positive electrode terminal 24a and the negative electrode terminal 25a to the connection terminals of the matching circuit 23 is a surface contact connection having a predetermined contact area so that reliability can be ensured even when a large current flows. In the first embodiment, to ensure a secure surface contact connection, the terminals each having a flat plate shape are connected by screwing. The connection between the terminals may be any connection means that provides a secure surface contact connection, and is not limited to the screwing connection.

In the first embodiment, the terminal width w (see FIG. 4) of the positive electrode terminal 24a protruding from the back-surface-side end of the oscillation electrode 24 is formed to be significantly narrower than the electrode width W (see FIG. 4) at the back-surface-side end of the oscillation electrode 24 (w<<W). This is for the purpose of obtaining a configuration where heat generated in the matching circuit 23 is difficult to conduct to the oscillation electrode 24 and of suppressing heat conduction between the matching circuit 23 and the oscillation electrode 24 to thereby restrain the occurrence of dew condensation on the matching circuit 23 when the oscillation electrode 24 is cooled. In the counter electrode 25 as well, the terminal width of the negative electrode terminal 25a is formed to be significantly narrower than the electrode width at the back-surface-side end of the counter electrode 25 from which the negative electrode terminal 25a protrudes, similarly to the terminal width of the positive electrode terminal 24a. By narrowing the terminal width of the negative electrode terminal 25a in this manner, heat conduction between the counter electrode 25 and the matching circuit 23 is suppressed.

As shown in FIGS. 2 and 4, the configuration is such that cold air having frozen the preserved stuff in the freezing/thawing chamber 5 passes, from the cold air exhaust hole 21 via the return air passage 34, through the electrode holding region 30 and returns to the cooling chamber 11. Due to such a configuration of the return air passage 34 passing through the electrode holding region 30, cold air from the freezing/thawing chamber 5 is not released in the electrode holding region 30 so that dew condensation is prevented in the electrode holding region 30 including the matching circuit 23.

In the configuration arranging the oscillating circuit 22 in the electrode holding region 30, a cooling configuration may be employed where a heat sink, which is a heat radiating member in the oscillating circuit 22, is brought into contact with the return air passage 34 to cool it.

As described above, since the electrode holding mechanism is disposed on the back surface side of the freezing/thawing chamber 5, the flat plate-shaped oscillation electrode 24 and the counter electrode 25 face each other substantially in parallel. In the configuration of the first embodiment, to further ensure that the oscillation electrode 24 and the counter electrode 25 face each other substantially in parallel, the electrode holding mechanism is disposed also on the front surface side of the freezing/thawing chamber 5.

As described above, the heat insulating box of the refrigerator 10 is configured from the outer box 1 made of steel plate, the inner box 2 molded of resin, and the heat insulation material (e.g. rigid urethane foam) 40 filled and foamed in the space between the outer box 1 and the inner box 2. The heat insulating box of the refrigerator 10 includes a crossrail 35 that is a frame for defining the edge of the front opening of each storage chamber. The crossrail 35 of the frame is joined at a predetermined position on the outer box 1 and is positioned with high accuracy with respect to the outer box 1. For this reason, the position of the crossrail 35 on the outer box 1 is not affected by the filled and foamed heat insulation material 40, resulting in a highly accurate position.

As shown in FIG. 2, the crossrail 35 is arranged at the front edge on the freezing/thawing chamber 5 and defines the front opening of the freezing/thawing chamber 5. This front opening is opened and closed by the door 29 of the freezing/thawing chamber 5. A gasket 36 is disposed between the door 29 and the crossrail 35 to prevent leakage of cold air at the time of closing.

The electrode holding mechanism on the front surface side of the freezing/thawing chamber 5 utilizes the crossrail 35 that is the frame accurately defining the front opening of the freezing/thawing chamber 5. A first holding claw 37 and a second holding claw 38 serving as holding members are integrally formed, with a predetermined interval, on substantially parallel top and bottom frame members of the crossrail 35. The first holding claw 37 and the second holding claw 38 as the holding members may be joined to the crossrail 35 that is the frame.

The first holding claw 37 as the holding member is configured to engage a front end of the oscillation electrode 24 in such a manner as to sandwich it and defines the position of the front end of the oscillation electrode 24. The second holding claw 38 as the holding member is configured to support a front end of the counter electrode 25 and defines the position of the front end of the counter electrode 25. The first holding claw 37 and the second holding claw 38 hold the respective front ends of the oscillation electrode 24 and the counter electrode 25 with the predetermined interval (first interval). The first holding claw 37 and the second holding claw 38 hold the oscillation electrode 24 and the counter electrode 25 in an electrically insulated state.

Accordingly, since the electrode holding mechanism is disposed on both the back and front surface sides of the dielectric heating mechanism of the freezing/thawing chamber 5 in the refrigerator 10 of the first embodiment, it is possible to arrange the oscillation electrode 24 and the counter electrode 25 with a highly accurate facing interval and to securely arrange them substantially in parallel with the predetermined interval (first interval). As a result, the dielectric heating mechanism of the freezing/thawing chamber 5 prevents a high-frequency electric field bias on the electrode surfaces to achieve the uniformity of the high-frequency electric field, leading to a configuration enabling the preserved stuff (frozen product) to be evenly thawed.

[Electromagnetic Wave Shielding Mechanism]

As described above, the freezing/thawing chamber 5 is configured to arrange and dielectrically heat the dielectric as the preserved stuff in a high-frequency electric field atmosphere between the oscillation electrode 24 and the counter electrode 25 and hence has a configuration capable of radiating electromagnetic waves. To prevent these electromagnetic waves from leaking to the outside of the refrigerator 10, the refrigerator 10 of the first embodiment includes an electromagnetic wave shielding mechanism extending so as to surround the freezing/thawing chamber 5.

As shown in FIG. 2, a top-surface-side electromagnetic wave shield 26 is disposed above the air passage 18 on the top surface side of the freezing/thawing chamber 5. The top-surface-side electromagnetic wave shield 26 is arranged on an upper surface of the heat insulation material 40 constituting the bottom surface side of the refrigerating chamber 3 directly above the freezing/thawing chamber 5 and is arranged so as to cover the top surface side of the freezing/thawing chamber 5. The top-surface-side electromagnetic wave shield 26 is configured to have a plurality of openings so that the area substantially facing the oscillation electrode 24 is reduced. The top-surface-side electromagnetic wave shield 26 configured in this manner suppresses the generation of an unnecessary electric field between it and the oscillation electrode 24. The top-surface-side electromagnetic wave shield 26 may be of a mesh structure having a plurality of openings. The top-surface-side electromagnetic wave shield 26 may be disposed within the interior of the refrigerating chamber 3 located directly above the freezing/thawing chamber 5, but since a partial chamber or a chilled chamber is often disposed in the refrigerating chamber 3, the top surface of this partial chamber or chilled chamber may be used as the electromagnetic wave shield.

A back-surface-side electromagnetic wave shield 27 is arranged so as to cover the electrode holding region 30 having the matching circuit 23, etc. disposed on the back surface side of the freezing/thawing chamber 5. Disposition of the back-surface-side electromagnetic wave shield 27 in this manner prevents an electric field occurring between the oscillation electrode 24 and the counter electrode 25 or high-frequency noise generated from the matching circuit 23 from affecting the actions (controls) of electrical parts of the cooling fan 13 and the damper 19. An electromagnetic wave shield (not shown) is arranged also on the lateral surface side of the freezing/thawing chamber 5.

Description will then be given of a door-side electromagnetic wave shield 39 disposed on the door 29 that opens and closes the front-surface-side opening of the freezing/thawing chamber 5. Since the door 29 is configured to open and close with respect to the main body of the refrigerator 10, in a configuration where the electromagnetic wave shield disposed on the door 29 is connected to the grounded portion of the main body of the refrigerator 10 by a wired path, opening and closing of the door 29 causes the wired path to repeatedly expand and contract, and metal fatigue accumulates in the wired path. Since the configuration connected in this manner becomes a factor of disconnection in the wired path, such a configuration is not preferable as to connect the electromagnetic wave shield 39 disposed on the door 29 to the grounded portion of the main body of the refrigerator 10 by the wired path.

Generally, in order to prevent electromagnetic wave leakage, it is necessary to make the interval between the electromagnetic wave shield 39 on the door side and the crossrail 35 serving as the electromagnetic wave shield on the main body side when the door 29 is closed, shorter than ¼ of the wavelength λ of the electromagnetic wave. In the first embodiment, by further reducing the interval, the grounding effect can be obtained without disposing the wired path. For example, the interval is set to 30 mm or less between the door side electromagnetic wave shield 39 and the crossrail 35 when the door 29 is closed. Since the crossrail 35 connected to the outer box 1 is grounded, the same effect as being grounded by the wired path can be obtained by bringing the door-side electromagnetic wave shield 39 close to the crossrail 35 with the door 29 closed. By employing the shape of the end of the door-side electromagnetic wave shield 39 bent toward the main body of the refrigerator 10, a configuration is obtained where the door side electromagnetic wave shield 39 can be easily brought close to the cross rail 35.

In the refrigerator 10 of the first embodiment, since the outer box 1 is made of a steel plate, the steel plate itself functions as an electromagnetic wave shield. For this reason, the electromagnetic wave inside the refrigerator 10 is prevented from leaking to the outside of the refrigerator 10.

[Configurations of Oscillation Electrode and Counter Electrode]

When the user opens the door 29, high humidity air flows from the outside into the freezing/thawing chamber 5 held in a freezing temperature range, so that the inside of the freezing/thawing chamber 5 is in a state where dew condensation easily occurs. If dew condensation occurs on the surfaces of the oscillation electrode 24 and the counter electrode 25, the electric field formation between the electrodes becomes unstable and a situation may occur in which the desired dielectric heating is not performed. To restrain such a situation from occurring, the refrigerator 10 of the first embodiment is configured such that the facing electrode surfaces of the oscillation electrode 24 and the counter electrode 25 are covered with the inner surface member 32 and that cold air is introduced into the freezing/thawing chamber 5 from the plurality of cold air introduction holes 20 formed in the oscillation electrode 24. Cold air introduced into the freezing/thawing chamber 5 is cold air delivered from the cooling chamber 11 through the air passage 18 by the cooling fan 13, and cold air at the time of introduction is in a state where humidity is relatively low. Therefore, even if the door 29 is opened and closed and high humidity air flows in from the outside, low-humidity cold air is blown into the freezing/thawing chamber 5 from the plurality of cold air introduction holes 20 formed on the entire top surface side, allowing air in the freezing/thawing chamber 5 to be discharged from the cold air exhaust hole 21 on the back side. For this reason, the inside of the freezing/thawing chamber 5 is in a state where dew condensation is hard to occur.

Figure 5:
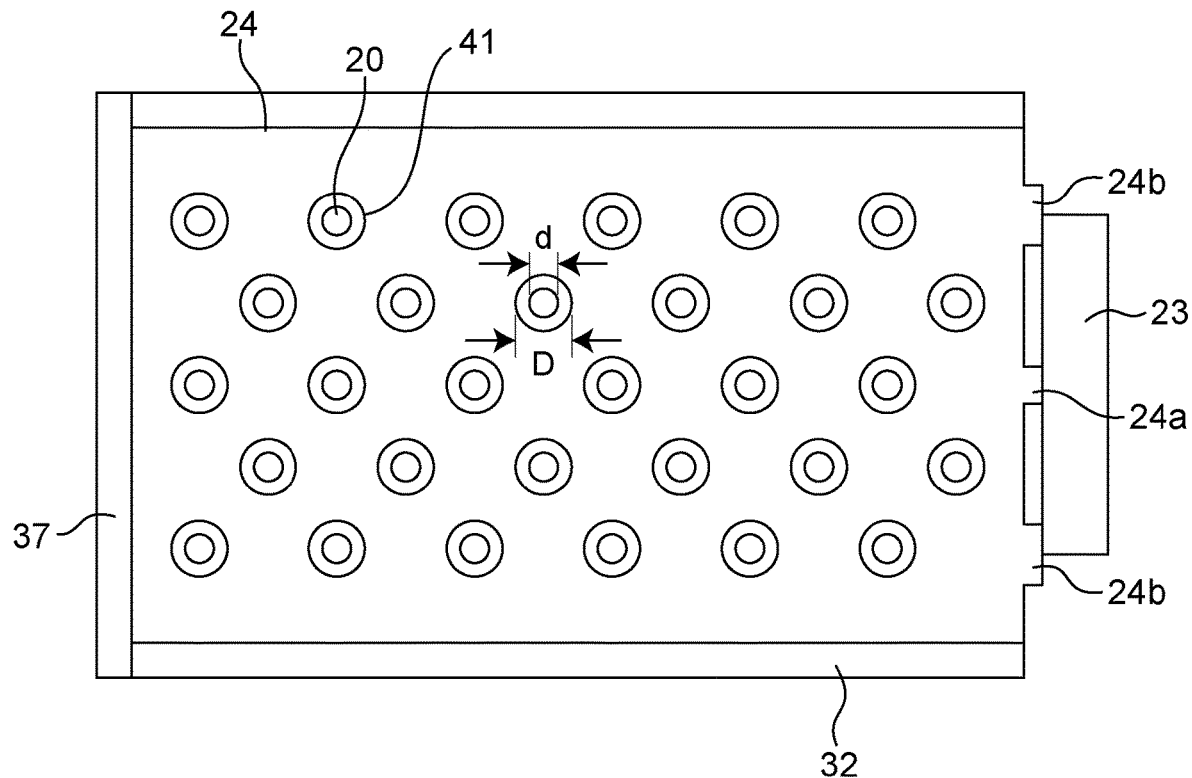
FIG. 5 is a plan view, as viewed from above, of an oscillation electrode on the top surface side of the freezing/thawing chamber and an inner surface member in the refrigerator of the first embodiment.

FIG. 5 is a plan view, as viewed from above, of the oscillation electrode 24 on the top surface side of the freezing/thawing chamber 5 and the inner surface member 32. As shown in FIG. 5, the oscillation electrode 24 has the plurality of electrode holes 41 formed therein, and the plurality of electrode holes 41 are dispersed over the entire surface of the electrode surface of the oscillation electrode 24. The electrode holes 41 are arranged substantially evenly at equal intervals on the electrode surface of the oscillation electrode 24. The electrode holes 41 of the oscillation electrode 24 are disposed corresponding to the positions of the cold air introduction holes 20 formed in the inner surface member 32 that covers the undersurface of the oscillation electrode 24. The hole diameter D of the electrode holes 41 is formed to be larger than the hole diameter d of the cold air introduction holes 20 of the inner surface member 32 (D>d).

Due to the plurality of electrode holes 41 formed substantially evenly at equal intervals in the electrode surface of the oscillation electrode 24, the region is evenly dispersed where the electric field is strongly formed on the electrode surface of the oscillation electrode 24, leading to a configuration capable of evenly performing dielectric heating of the preserved stuff. That is, the edge part of the opening portion in the electrode hole 41 becomes an electric field concentration region. Note that the shapes and arrangements of the plurality of cold air introduction holes 20 and electrode holes 41 shown in FIG. 5 are examples and that the shapes and arrangements of the cold air introduction holes 20 and electrode holes 41 are properly designed in consideration of the efficiency and the manufacturing costs, depending on the specifications, configurations, etc. of the refrigerator.

Figure 6:
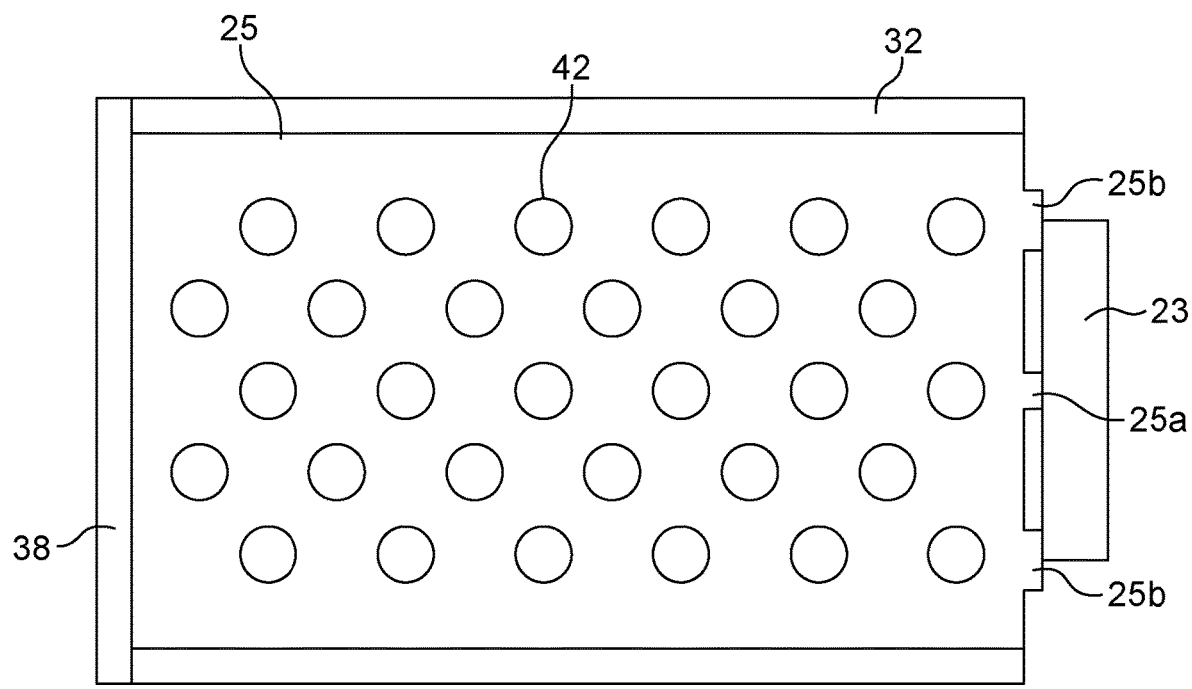
FIG. 6 is a back view showing a counter electrode on the bottom surface side arranged to face the oscillation electrode in the refrigerator of the first embodiment.

FIG. 6 is a back view showing the counter electrode 25 on the bottom surface side arranged to face the oscillation electrode 24. FIG. 6 is a view of the counter electrode 25 as viewed from below, in which the inner surface member 32 constituting the bottom surface of the freezing/thawing chamber 5 is arranged on the counter electrode 25. As shown in FIG. 6, similar to the oscillation electrode 24, a plurality of electrode holes 42 are formed substantially evenly at equal intervals on the electrode surface of the counter electrode 25. Note, however, that in the configuration of the first embodiment, the electrode hole 42 of the counter electrode 25 is formed at a position not facing the electrode hole 41 of the oscillation electrode 24. That is, the position of a vertically extending central axis of the electrode hole 42 of the counter electrode 25 is offset from the position of a vertically extending central axis of the electrode hole 41 of the oscillation electrode 24, with the result that the electrode hole 42 of the counter electrode 25 and the electrode hole 41 of the oscillation electrode 24 are misaligned in the vertical direction (opposing direction).

Although in the configuration of the first embodiment, the shape and arrangement of the electrode holes 41 of the oscillation electrode 24 have been described with the configuration in which the plurality of electrode holes 41 are arranged substantially evenly at equal intervals, the present invention is not limited to such a configuration, and, for example, the shape may be such that at least one opening portion is formed in the oscillation electrode 24, whereby the edge part of the opening portion becomes the electric field concentration region where the electric field concentrates on the electrode surface of the oscillation electrode 24. That is, in the present invention, the configuration may be such that the electric field concentration region is dispersed on the electrode surface of the oscillation electrode 24. Although in the first embodiment, the configuration has been described where the plurality of electrode holes 42 are disposed in the electrode surface of the counter electrode 25, the present invention is not limited to the configuration having the plurality of electrode holes 42 in the counter electrode 25, and needs only to have an opening formed so that a desired electric field is formed between the electrodes i.e. the oscillation electrode 24 and the counter electrode 25.

Figure 7:
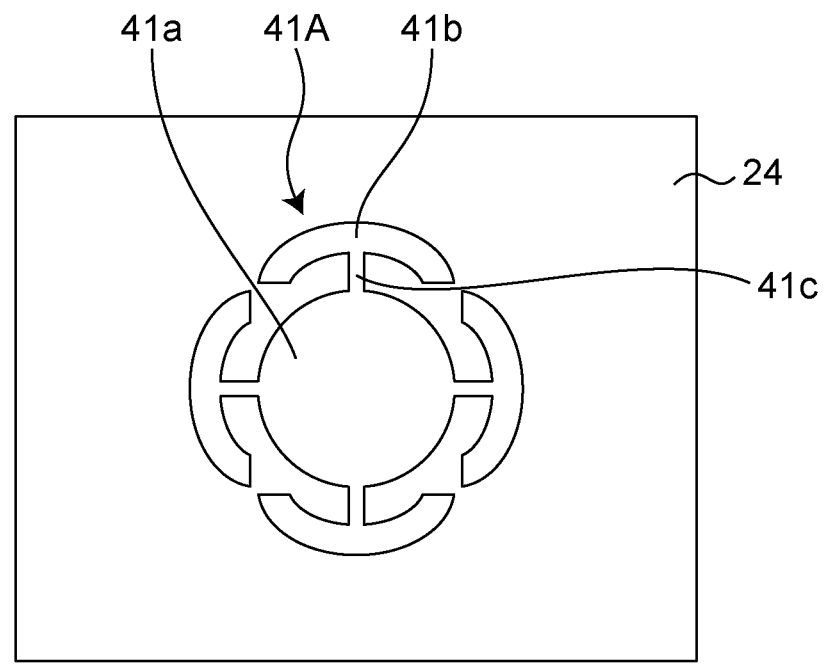
FIG. 7 is a plan view showing a modification of the oscillation electrode in the refrigerator of the first embodiment.
Figure 7:
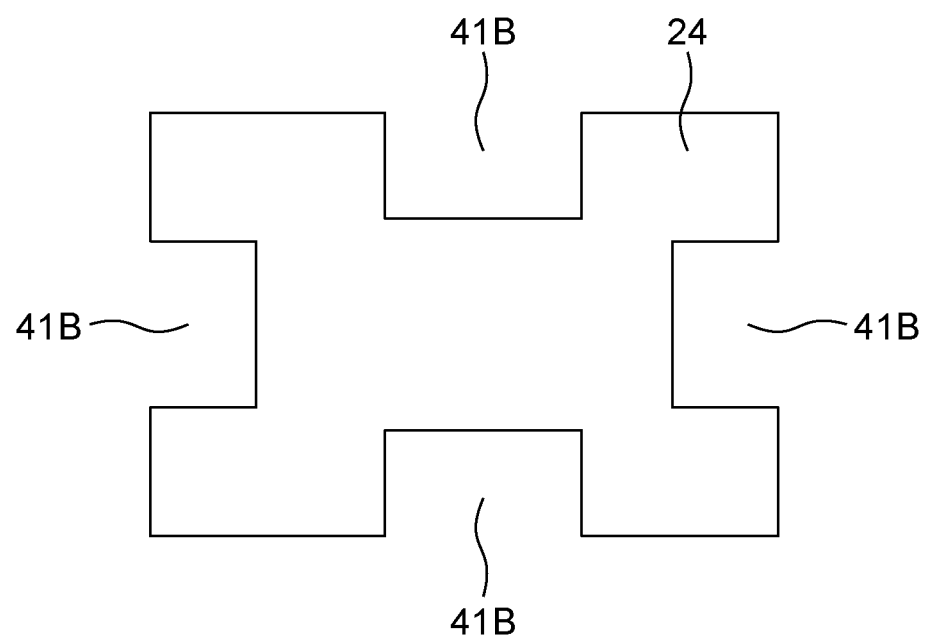

FIG. 7 is a plan view showing examples as modifications of the oscillation electrode 24 in the first embodiment. The modification shown in (a) of FIG. 7 shows an example where a single opening portion is formed as an electrode hole 41A in the oscillation electrode 24. In the first embodiment, the opening portion formed in the oscillation electrode 24 serves as an electrode opening, which includes the electrode holes (41 and 41A). The electrode opening 41A shown in (a) of FIG. 7 is configured to include a circular opening 41a, an arc-shaped opening 41b, and a communication opening 41c that allows the respective openings (41a and 41b) to communicate with each other. By employing the electrode opening 41A having such a shape, the region with a strengthened electric field can be dispersed on the electrode surface of the oscillation electrode 24. The modification shown in (b) of FIG. 7 shows a modification of an electrode opening (41B) in the oscillation electrode 24 and is an example having the electrode notch 41B in the form of a notched portion formed in the oscillation electrode 24B. By forming the electrode notch 41B as the electrode opening, as shown in (b) of FIG. 7, the configuration is obtained where the region with a strengthened electric field is dispersed on the electrode surface of the oscillation electrode 24. The cold air introduction holes 20 formed in the inner surface member 32 covering the undersurface of the oscillation electrode 24 are formed at positions corresponding to the electrode openings (41, 41A, and 41B) of the oscillation electrode 24 so that cold air from the air passage 18 is smoothly introduced into the freezing/thawing chamber 5.

As described above, the top surface side of the freezing/thawing chamber 5 in the first embodiment is configured such that cold air is introduced, through the electrode openings (41, 41A, and 41B) that are opening portions of the oscillation electrode 24 constituting the undersurface of the air passage 18, into the interior of the freezing/thawing chamber 5. Accordingly, the freezing/thawing chamber 5 is configured such that cold air is blown from the cold air introduction holes 20 formed on the top surface side, whereby a uniform and rapid freezing process can be performed in the freezing/thawing chamber 5. Further, since the electric field concentration region is formed so as to be dispersed on the electrode surface of the oscillation electrode 24, uniform dielectric heating can be performed on the preserved stuff, achieving a satisfactory thawing.

In the configuration shown in FIGS. 5 and 6 described above, the electrode hole 41 of the oscillation electrode 24 and the electrode hole 42 of the counter electrode 25 are formed such that their respective central axes extending in the vertical direction (opposing direction) do not coincide, whereby the electric field concentration region is dispersed on the oscillation electrode 24 and the counter electrode 25, to obtain a uniform electric field in the storage space where the oscillation electrode 24 and the counter electrode 25 confront each other. As a result, the preserved stuff placed in the storage space of the freezing/thawing chamber 5 can be subjected to more uniform dielectric heating.

The inventor simulated the electric field generation between the electrodes, using the freezing/thawing chamber 5 having the electrode configuration of the first embodiment and a freezing/thawing chamber 5X, as a comparative example, having an electrode configuration provided with a counter electrode 25X not having electrode holes.

Figure 8:
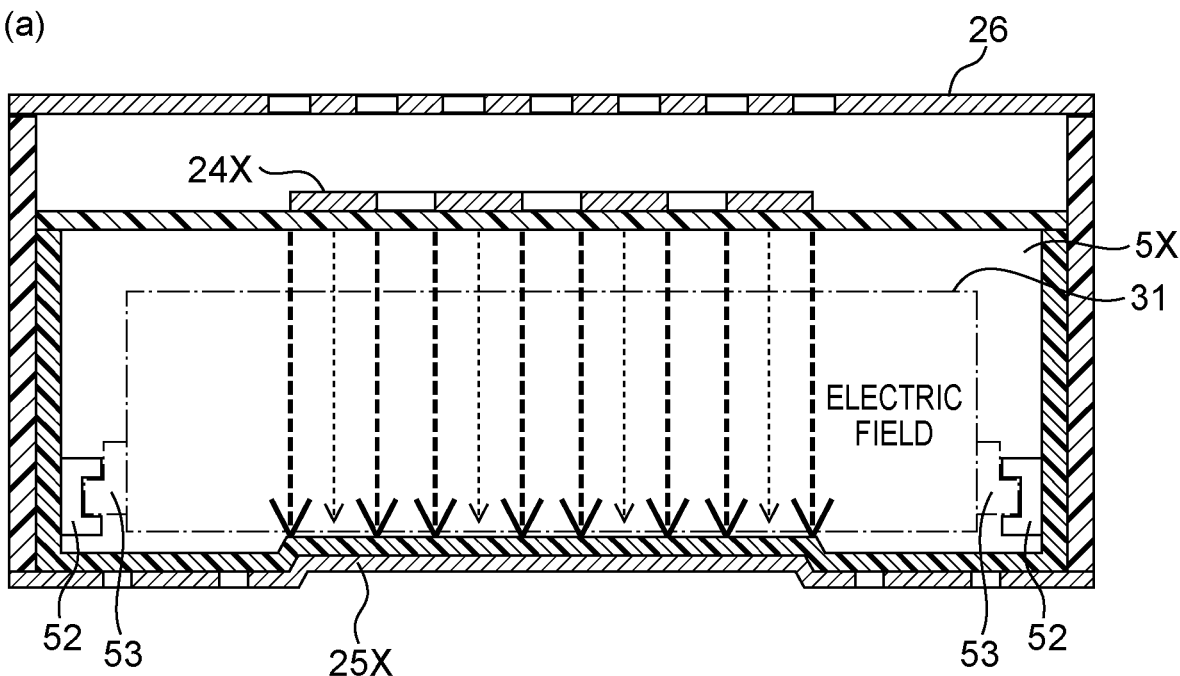
FIG. 8 shows, in (a), a sectional view schematically showing an dielectric heating configuration provided with a counter electrode not having electrode holes and shows, in (b), an electric field simulation diagram showing a result of simulating the dielectric heating configuration shown in (a).
Figure 8:
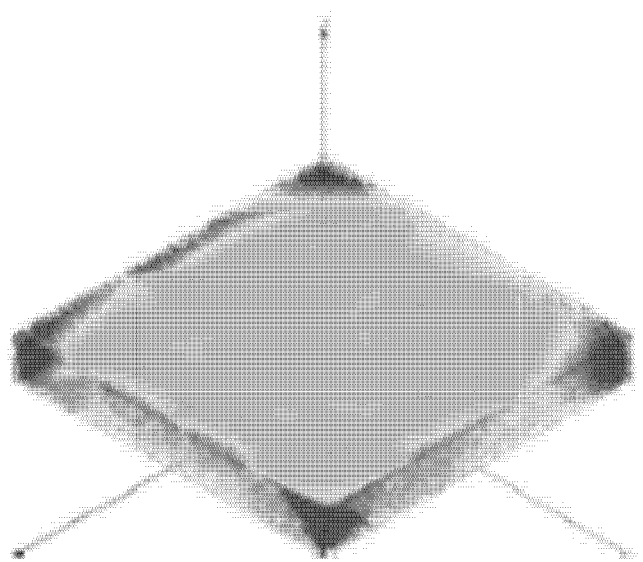

FIG. 8(a) is a sectional view schematically showing the electrode configuration provided with the counter electrode 25X not having electrode holes and is a view obtained by cutting the freezing/thawing chamber 5X in the left-right direction. FIG. 8(b) is a result of simulating the electric field strength when an electric field is applied to the electrodes of the electrode configuration shown in FIG. 8(a). In FIG. 8(b), a dark portion is a region where the electric field concentrates. As is clear from this electric field simulation diagram, the electric field concentrates on outer edge portions of the electrode, and particularly on corner portions.

Figure 9:
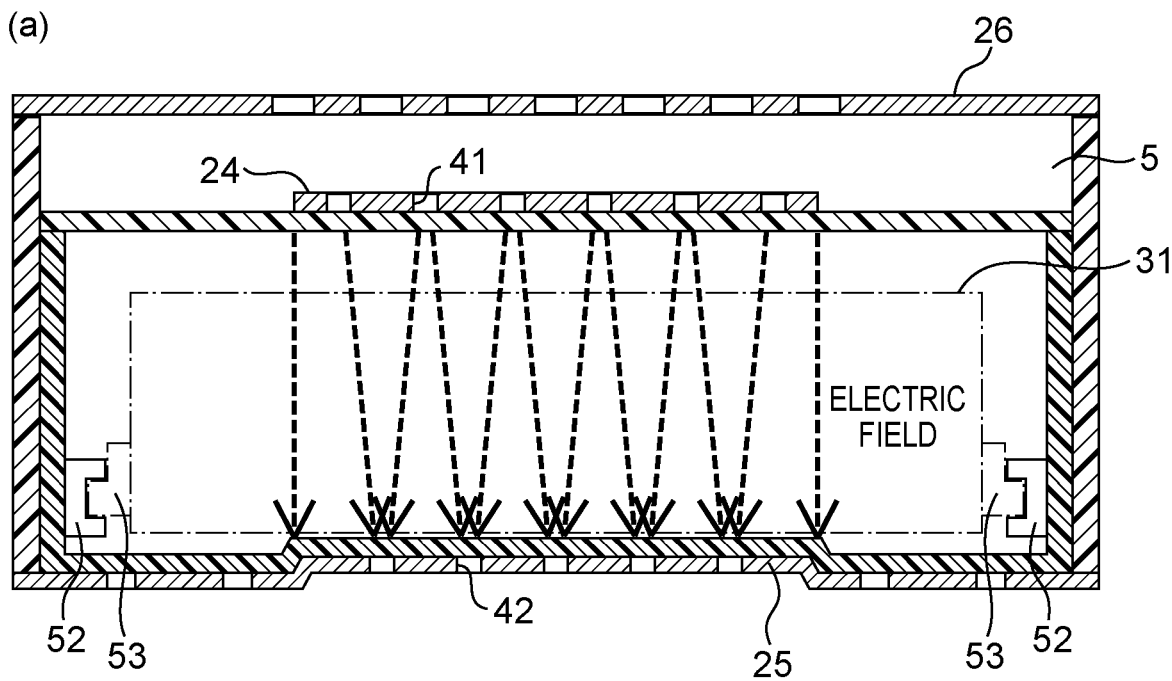
FIG. 9 shows, in (a), a sectional view schematically showing a dielectric heating configuration provided with a counter electrode having electrode holes and shows, in (b), an electric field simulation diagram showing a result of simulating the dielectric heating configuration shown in (a).
Figure 9:
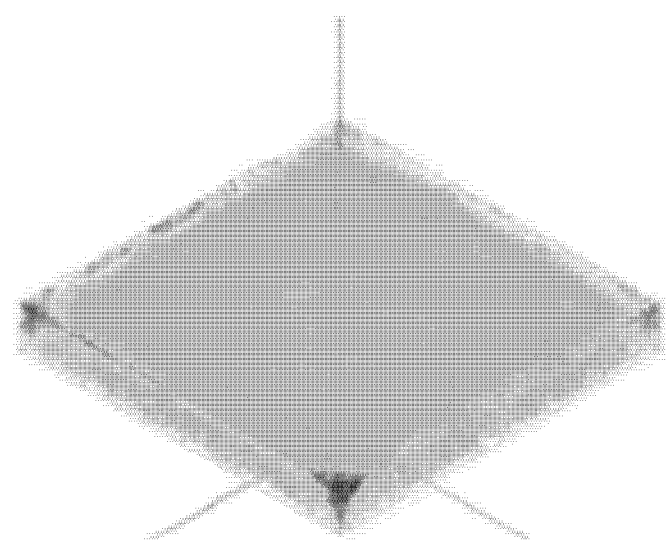

FIG. 9(a) is a sectional view schematically showing the electrode configuration of the freezing/thawing chamber 5 having the configuration of the first embodiment and is a view obtained by cutting the freezing/thawing chamber 5 in the left-right direction. FIG. 9(b) is a result of simulating the electric field strength when an electric field is applied to the electrodes of the electrode configuration shown in FIG. 9(a). In FIG. 9(b) as well, similar to FIG. 8(b), a dark portion is a region where the electric field concentrates. As is clear from this electric field simulation diagram, it can be understood that the dielectric heating configuration of FIG. 9(a) relieves the electric field concentration over the entire electrodes, as compared with the electric field simulation diagram of FIG. 8(b), to thereby uniformize the electric field.

As shown in FIG. 9(b), the electric field concentration is relieved over the entire electrodes by arranging the electrode hole 41 of the oscillation electrode 24 and the electrode hole 42 of the counter electrode 25 such that their vertically (in the facing direction) extending central axes do not coincide. In the electrode configuration where the electrode hole 41 of the oscillation electrode 24 and the electrode hole 42 of the counter electrode 25 are arranged such that their vertically (in the facing direction) extending central axes coincide, the electric field concentration was relieved and particularly the electric field concentration at the corner portions was relieved, as compared with the configuration provided with the counter electrode 25X not having the electrode holes shown in FIG. 8.

The freezing/thawing chamber 5 of the refrigerator 10 of the first embodiment has the configuration in which the storage case 31 is fixed to the back surface side of the door 29 as shown in FIG. 2. The configuration is such that the storage case 31 moves back and forth inside the freezing/thawing chamber 5 as the door 29 opens and closes. In the configuration of the first embodiment, rails 52 are disposed on both lateral surfaces of the freezing/thawing chamber 5 so that the storage case 31 can move smoothly inside the freezing/thawing chamber 5 (see FIG. 9). Frames 53 sliding along the rails 52 are disposed on both outer lateral surfaces of the storage case 31. These sliding members of the rails 52 and the frames 53 are disposed at positions outside a dielectric heating region that is a region of the freezing/thawing chamber 5 where the oscillation electrode 24 and the counter electrode 25 face each other, so as not to be dielectrically heated.

Since, as described above, the refrigerator 10 of the first embodiment includes the heating device having the electric field concentration region formed on the electrode surface of the oscillation electrode 24, a configuration is obtained where a high-frequency electric field in a desired state can be applied between the oscillation electrode 24 and the counter electrode 25. As a result, the refrigerator 10 of the first embodiment presents an excellent effect that a frozen product can be thawed to the desired high quality state in a short time when the dielectric heating is performed to execute the thawing process in the freezing/thawing chamber 5, resulting in a configuration capable of reducing the size of the refrigerator as a refrigerator having an excellent thawing function by using the heating device with the dielectric heating mechanism composed of semiconductor elements.

Although in the refrigerator 10 of the first embodiment, the configuration having both the freezing function and the thawing function as the freezing/thawing chamber 5 has been described, it may be configured to include a thawing chamber having only the thawing function.

Second Embodiment

Hereinafter, a refrigerator of a second embodiment according to the present invention will be described with reference to the accompanying drawings. The refrigerator of the second embodiment has a configuration in which a heating device is incorporated. The heating device incorporated in the refrigerator of the second embodiment has a configuration in which the structure making up the freezing/thawing chamber 5 in the refrigerator 10 of the first embodiment described above is composed of a high-frequency heating device. The heating device of the second embodiment may employ configurations similar to the electrode structure, the electrode holding mechanism, and the electromagnetic wave shielding mechanism of the first embodiment, but the present invention may use configurations described in the second embodiment to provide a similar effect. The other configurations of the refrigerator having the heating device of the second embodiment incorporated therein are the same as in the refrigerator 10 of the first embodiment. In description of the second embodiment, the same reference numerals are imparted to elements having similar actions, configurations, and functions to the first embodiment and the description thereof may be omitted to avoid duplicate description. Regarding the dielectric heating mechanism that can evenly heat an object to be heated arranged in the heating space of the heating device incorporated in the refrigerator of the second embodiment, a configuration is also possible that allows sole use as a heating device without incorporation into the refrigerator.

Figure 10:
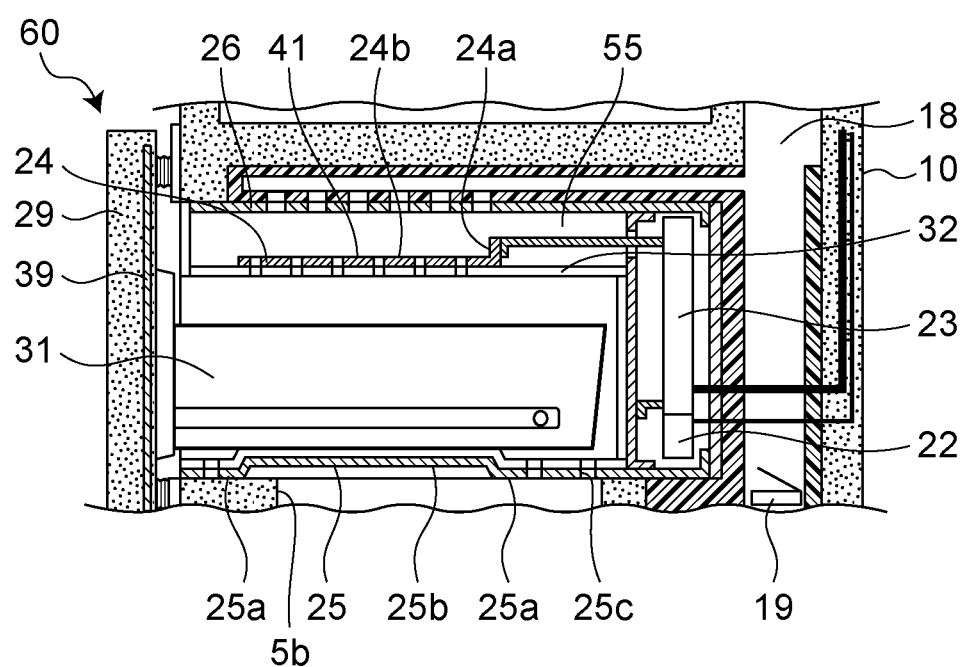
FIG. 10 is a longitudinal sectional view showing a heating chamber of a heating device of a second embodiment according to the present invention.

FIG. 10 is a longitudinal sectional view showing a high-frequency heating device that is a heating device of the second embodiment. The high-frequency heating device of FIG. 10 shows the state of being incorporated in the refrigerator 10 and includes a heating chamber 55 functioning as the freezing/thawing chamber. The heating chamber 55 has a heating space containing an object to be heated and dielectrically heats the object to be heated contained in the heating space (storage space).

A top surface, a back surface, both lateral surfaces, and a bottom surface making up the inner surface of the heating space in the heating chamber 55 are formed from the inner surface member 32 of resin molded of an electrically insulating material. The door 29 is disposed on the front-surface-side opening of the heating chamber 55 so that the heating space of the heating chamber 55 is sealed by closing the door 29. The heating chamber 55 of the second embodiment includes the storage case 31 whose upper part is opened, disposed on the back surface side of the door 29 and is configured to allow the storage case 31 to move forward and backward simultaneously when opening and closing the door 29 in the front-back direction. This configuration is the same as the configuration of the freezing/thawing chamber 5 of the first embodiment.

The dielectric heating mechanism of the heating device in the second embodiment includes the oscillating circuit 22, the matching circuit 23, the oscillation electrode 24, the counter electrode 25, and the control unit (not shown). In the heating device of the second embodiment, the oscillating circuit 22 together with the matching circuit 23 is arranged on the back surface side of the heating chamber 55. The heating chamber 55 is capable of dielectrically heating the preserved stuff contained in the heating space and, similar to the freezing/thawing chamber 5 of the first embodiment, acts both as the freezing chamber keeping, in the freezing temperature range, the preserved stuff such as food contained in the heating chamber 55 and as the thawing chamber performing the thawing process by dielectric heating when accepting a thawing command for the preserved stuff in the refrigerator 10.

The oscillating circuit 22 and the matching circuit 23 is a high-frequency electric field forming unit for forming a high-frequency electric field applied to between electrodes of the oscillation electrode 24 and the counter electrode 25. The oscillation electrode 24 is a flat electrode arranged on the top surface side of the heating chamber 55. The counter electrode 25 is a flat electrode arranged on the bottom surface side of the heating chamber 55. The oscillation electrode 24 and the counter electrode 25 are arranged facing each other via the heating space (storage space/thawing space) of the heating chamber 55. In the dielectric heating mechanism of the second embodiment, the oscillation electrode 24 and the counter electrode 25 are arranged substantially in parallel, and the oscillation electrode 24 is disposed on one side of the heating space, while the counter electrode 25 is disposed on the other side of the heating space with the heating space in between. The inner surface member 32 covers the matching circuit 23 on the back surface side, the oscillation electrode 24 on the top surface side, and the counter electrode 25 on the bottom surface side making up the dielectric heating mechanism, so as to have a configuration that can reliably prevent burning due to contact with preserved stuff.

Although the configuration of the second embodiment is also described, similar to the configuration of the first embodiment, as the configuration where the oscillation electrode 24 is disposed on the top surface part making up the heating space of the heating chamber 55, with the counter electrode 25 disposed on the bottom surface part of the heating space, the present invention is not limited to this configuration. Any configuration is acceptable as long as the oscillation electrode 24 and the counter electrode 25 face each other via the heating space, and the same effect is achieved also by arranging them upside down or by arranging them to face each other in the left-right direction.

As has been described with reference to FIGS. 5 and 7 in the above first embodiment, the oscillation electrode 24 is formed such that the electric field concentration region is dispersed on the electrode surface of the oscillation electrode 24, whereby uniform dielectric heating can be performed on the preserved stuff. As described in the first embodiment, the electric field concentration region is composed of the edge part of the opening portion formed on the electrode surface.

In the configuration of the heating device of the second embodiment, the positive electrode terminal 24a serving as a connection terminal is formed at the end of the oscillating electrode 24 in the arrangement direction of the matching circuit 23. This positive electrode terminal 24a is connected in surface contact to a connection terminal extending from the matching circuit 23. In the second embodiment, they are fastened together by screwing for easy assembly and maintenance. Similar to the configuration of the first embodiment, the terminal width w (see FIG. 4) of the positive electrode terminal 24a of the oscillation electrode 24 is formed to be significantly narrower than the electrode width W (see FIG. 4) of the oscillation electrode 24 (w<<W). The terminal width of the negative electrode terminal 25a of the counter electrode 25 is formed to be significantly narrower than the electrode width of the counter electrode 25 from which the negative electrode terminal 25a protrudes.

In the counter electrode 25, the region facing the electrode surface 24b of the oscillation electrode 24 is the electrode surface 25b. As shown in FIG. 10, the electrode surface 25b of the counter electrode 25 is formed from a flat surface arranged at a high position raised so as to approach the oscillation electrode 24. On the contrary, in the counter electrode 25, the region 25a not facing the electrode surface 24b of the oscillation electrode 24 is arranged at a low position recessed toward the back surface side so as not to function as a substantial electrode surface. The region 25a of the counter electrode 25 has a plurality of openings so as to reduce the facing area. In this manner, the configuration is such that the electrode surface 24b of the oscillation electrode 24 and the electrode surface 25b of the counter electrode 25 are brought close to each other and such that the openings are formed in the region 25a not facing the electrode surface 24b of the oscillation electrode 24 so that a desired electric field is securely formed only between the electrodes.

The inner surface member 32 is disposed on the inner surface of the heating space of the heating chamber 55. The inner surface member 32 defining the inner surface of the heating space is made of an electrically insulating material and is configured to cover the matching circuit 23 on the back surface side, the electrode surface of the oscillation electrode 24 on the top surface side, and the electrode surface of the counter electrode 25 on the bottom surface side that make up the dielectric heating mechanism. Such disposition of the inner member 32 on the inner surface of the heating chamber 55 prevents burning caused by contact with the object to be heated contained in the heating space.

As described above, the heating device of the second embodiment is configured to have the dielectric heating mechanism and is configured to include the heating chamber 55 containing the object to be heated. The thus configured heating device is incorporated in the refrigerator 10 such that cold air is introduced into the heating chamber 55.

FIG. 11 is a longitudinal sectional view showing the state when the heating device is incorporated in the refrigerator. As shown in FIG. 11, the heating device is incorporated as a thawing module 60 into the refrigerator 10. In this manner, the heating device of the second embodiment has a configuration allowing both the use as the thawing module 60 imparting a thawing function to the refrigerator 10 and the use as the high-frequency heating device having the ordinary dielectric heating function. Thus, in the configuration of the heating device of the second embodiment, the configuration having the dielectric heating function is composed of an integrated box body, whereupon it is possible to easily assemble a high-value-added refrigerator having a thawing function.

In the refrigerator 10 having the thawing module 60 (heating device) incorporated therein, the configuration is such that cold air formed by a cooling mechanism of the refrigerator 10 is introduced from the top surface side of the heating chamber 55 through the air passage 18, as shown in FIG. 10. On the top surface side of the heating chamber 55, the top-surface-side electromagnetic wave shield 26 is disposed directly below the air passage 18. Furthermore, the inner surface member 32 is disposed under the top-surface-side electromagnetic wave shield 26 via a predetermined space.

In the thawing module 60, the oscillation electrode 24 is arranged in contact with the top-surface-side inner member 32 and openings are formed that extend through the oscillation electrode 24 and the inner member 32. These openings correspond to the electrode holes 41 of the oscillation electrode 24 and the cold air introduction holes 20 and act as the cold air introduction holes allowing cold air from the air passage 18 to be introduced through the openings of the top-surface-side electromagnetic wave shield 26 into the heating chamber 55.

In the refrigerator having the thawing module 60 (heating device) of the second embodiment incorporated therein, cold air introduced into the heating chamber 55 flows through the openings formed on the region 25a of the counter electrode 25 on the bottom surface side and is discharged to the freezing chamber 6 that is the storage chamber arranged directly below the heating chamber 55. Thus, in the second embodiment, the configuration is such that a communication opening 56 is formed at a partition between the heating chamber 55 of the refrigerator and the freezing chamber 6 lying directly therebelow. The storage case 31 of the heating chamber 55 may have an opening (slit, aperture, etc.) so as to ensure a smooth flow from the storage case 31 to the communication opening 56. The opening formed in the storage case 31 is properly designed in consideration of the flow of cold air. As a modification of the configuration of the thawing module 60 (heating device) of the second embodiment, the return air passage (34) described in the first embodiment may be disposed so that cold air within the heating chamber returns through the back surface side of the heating chamber 55 to the cooling mechanism of the refrigerator 10.

The configuration of the heating device of the second embodiment also has a similar configuration to that including the oscillation electrode 24 and the counter electrode 25 described with reference to FIGS. 5 to 7, where a desired electric field is formed between the electrodes of the oscillation electrode 24 and the counter electrode 25, so that even dielectric heating can be performed on the object to be heated.

As described above, the heating device of the second embodiment is formed such that the electric field concentration region is dispersed on the electrode surface of the oscillation electrode 24 so that uniform dielectric heating can be performed on the object to be heated contained in the heating chamber 55. By incorporating the heating device of the second embodiment as the thawing module 60 into the refrigerator 10, a configuration is obtained where a refrigerator having an excellent thawing function can be easily manufactured.

As set forth hereinabove, the present invention can provide a heating device capable of uniformizing the electric field between the electrodes in the dielectric heating, so that the object to be heated can be uniformly heated using this heating device, and by incorporating this heating device into the refrigerator, a highly safe refrigerator can be built that includes a storage chamber allowing the frozen product to be easily thawed to a high quality state and that ensures reliable cooling and storage functions.

As described above, the heating device of the present invention can dielectrically heat the object to be heated to a desired state, and the refrigerator having this heating device incorporated therein presents an excellent effect that the frozen product in a desired state can be thawed to a desired state in a short time. According to the present invention, the heating device having the dielectric heating mechanism composed of semiconductor elements has a configuration capable of implementing the excellent function that the object to be heated can be subjected to uniform heating, in a simple and size-reduced manner. The refrigerator with this heating device incorporated therein can achieve size reduction of the refrigerator having the excellent thawing function.

Although the present invention has been described in each embodiment with some detail, contents of disclosure of these embodiments should change in the details of the configuration, and replacing, combining, and permuting elements in each embodiment can be implemented without departing from the scope of the present invention claimed and from the idea thereof.

INDUSTRIAL APPLICABILITY

The present invention can provide a heating device capable of evenly heating an object to be heated and can provide a refrigerator capable of processing each of freezing, storage, and thawing of a preserved stuff to a desired state, thereby rendering possible the provision of products with high market value.

EXPLANATIONS OF LETTERS OR NUMERALS 1 outer box
2 inner box
3 refrigerating chamber
4 ice-making chamber
5 freezing/thawing chamber
6 freezing chamber
7 vegetable chamber
8 machine chamber
9 compressor
10 refrigerator
20 cold air introduction hole
21 cold air exhaust hole
22 oscillating circuit
23 matching circuit
24 oscillation electrode
25 counter electrode
26 top-surface-side electromagnetic wave shield
27 back-surface-side electromagnetic wave shield
28 front-surface-side electromagnetic wave shield
29 door
30 electrode holding region
31 storage case
32 inner surface member
33 interval defining unit
34 return air passage
40 heat insulation material
41 electrode hole (oscillation electrode)
42 electrode hole (counter electrode)

The invention claimed is:

1. A heating device comprising:
a heating chamber having a heating space that contains an object to be heated;
an oscillation electrode disposed on a first side of the heating space and comprising an electrode plate on which an electric field concentration region is formed;
a counter electrode disposed on a second side the other hand of the heating space opposed to the first side and comprising an electrode plate that faces the electrode plate of the oscillation electrode;
a high-frequency electric field forming unit for forming a high-frequency electric field applied between the electrode plate of the oscillation electrode and the electrode plate of the counter electrode;
an inner surface member that covers a first surface of the electrode plate of the oscillation electrode, the first surface facing to the heating chamber; and
an air passage through which cold air passes, the air passage being disposed on a second surface of the electrode plate of the oscillation electrode, the second surface being an opposite surface from the first surface; wherein
the oscillation electrode includes an opening portion formed in the electrode plate of the oscillation electrode and extending from the first surface to the second surface of the electrode plate of the oscillation electrode,
the inner surface member includes a cold air introduction hole, and
the location of the opening portion of the electrode plate of the oscillation electrode corresponds to the location of the cold air introduction hole of the inner surface member so that the cold air is introduced from the air passage to the heating chamber through the opening portion and the cold air introduction hole.

2. The heating device according to claim 1, wherein the electric field concentration region of the electrode plate of the oscillation electrode is an edge part of the opening portion formed in the electrode plate of the oscillation electrode.

3. The heating device according to claim 2, wherein the opening portion formed in the electric field concentration region of the oscillation electrode is an electrode hole or an electrode notch.

4. The heating device according to claim 3, wherein the counter electrode includes an opening portion in the electrode plate of the counter electrode, and the electric field concentration region of the counter electrode is an edge part of the opening portion of the electrode plate of the counter electrode.

5. The heating device according to claim 4, wherein the opening portion formed in the electric field concentration region of the counter electrode is an electrode hole or an electrode notch.

6. The heating device according to claim 1, wherein the electrode plate of the oscillation electrode and the electrode plate of the counter electrode are configured not to be exposed to the heating space.

7. The heating device according to claim 1, comprising a second inner surface member that covers a first surface of the electrode plate of the counter electrode, the first surface of the electrode plate of the counter electrode facing to the heating chamber, wherein
the inner surface member that covers the electrode plate of the oscillation electrode and the second inner surface member that covers the electrode plate of the counter electrode define an inner surface of the heating chamber.

8. The heating device according to claim 1, comprising an electromagnetic wave shield that restrains radiation of electromagnetic waves from the oscillation electrode and the counter electrode to the outside of the device.

9. The heating device according to claim 1, comprising a door that allows the object to be heated to be put in and taken out from the heating space of the heating chamber, wherein the door has an electromagnetic wave shield disposed thereon.

10. A refrigerator comprising the heating device according to claim 1.

11. The heating device according to claim 3, wherein a hole diameter of the electrode hole or notch in the electrode plate of the oscillation electrode is larger than a hole diameter of the cold air introduction hole of the inner surface member.

12. The heating device according to claim 2, wherein an electric field concentration region is formed on the electrode plate of the counter electrode, with the electric field concentration region of the electrode plate of the counter electrode being arranged so as not to face the electric field concentration region of the electrode plate of the oscillation electrode.

13. The heating device according to claim 5, wherein a position of a central axis of the electrode hole or notch of the electrode plate of the counter electrode is offset from a position of a central axis of the electrode hole or notch of the electrode plate of the oscillation electrode, whereby the electrode hole or notch of the counter electrode and the electrode hole or notch of the oscillation electrode are misaligned.

* * * * *